United States Patent
Collins et al.

(10) Patent No.: US 10,455,021 B2
(45) Date of Patent: Oct. 22, 2019

(54) SYSTEMS, APPARATUS, AND METHODS FOR CONFIGURING DEVICE DATA STREAMS

(71) Applicant: eBay Inc., San Jose, CA (US)

(72) Inventors: Michael David Collins, Portland, OR (US); David W. Goldman, Portland, OR (US)

(73) Assignee: eBay Inc., San Jose, CA (US)

(*) Notice: Subject to any disclaimer, the term of this patent is extended or adjusted under 35 U.S.C. 154(b) by 1177 days.

(21) Appl. No.: 14/563,796

(22) Filed: Dec. 8, 2014

(65) Prior Publication Data
US 2016/0164972 A1 Jun. 9, 2016

(51) Int. Cl.
*H04L 29/08* (2006.01)
*H04W 4/70* (2018.01)
*H04W 4/029* (2018.01)

(52) U.S. Cl.
CPC ............ *H04L 67/12* (2013.01); *H04W 4/029* (2018.02); *H04W 4/70* (2018.02)

(58) Field of Classification Search
None
See application file for complete search history.

(56) References Cited

U.S. PATENT DOCUMENTS

| 8,042,164 | B2 | 10/2011 | Sheynblat et al. |
| 8,621,583 | B2 | 12/2013 | Yang et al. |
| 8,669,869 | B2 | 3/2014 | Takaya |
| 9,107,565 | B2 * | 8/2015 | Jain ..................... A61B 5/00 |
| 2007/0011317 | A1 | 1/2007 | Brandyburg et al. |
| 2007/0124292 | A1 | 5/2007 | Kirshenbaum et al. |
| 2012/0038462 | A1 | 2/2012 | Adler et al. |
| 2012/0042326 | A1 | 2/2012 | Jain et al. |

(Continued)

FOREIGN PATENT DOCUMENTS

| WO | WO-2013072925 A2 | 5/2013 |
| WO | WO-2013152431 A1 | 10/2013 |

(Continued)

OTHER PUBLICATIONS

"International Application Serial No. PCT/US2015/042132, International Search Report dated Dec. 10, 2015", 4 pgs.

(Continued)

*Primary Examiner* — Robert K Carpenter
(74) *Attorney, Agent, or Firm* — Schwegman Lundberg & Woessner, P.A.

(57) ABSTRACT

Configuring device data streams (DDSs) of a mobile device is described herein. DDSs can include sensor data (captured from one or more sensors of the mobile device) and user-specific data (including application data from applications executed via the mobile device, as well as non-application data). DDS configuration parameters define modifications for the user-specific data and/or the sensor data of the DDS; these modifications can include removing or altering the user-specific data and/or the sensor data. DDSs can be sent to an external storage device via a network, and DDS modifications can be made at the mobile device or at the external storage device. Modified DDSs can be provided to requestors, and thus, the DDS configuration parameters allow a user to control what data is, or is not, included in a DDS for reasons related to privacy, data usage, etc.

20 Claims, 7 Drawing Sheets

(56) References Cited

U.S. PATENT DOCUMENTS

| | | |
|---|---|---|
| 2013/0262642 A1 | 10/2013 | Kutch |
| 2013/0273879 A1 | 10/2013 | Eisen et al. |
| 2013/0340050 A1 | 12/2013 | Harrison |
| 2014/0025791 A1 | 1/2014 | Johannsen |
| 2014/0343896 A1 | 11/2014 | La Grand |
| 2015/0106935 A1 | 4/2015 | Burns et al. |
| 2015/0256423 A1 | 9/2015 | Stearns |
| 2016/0036894 A1 | 2/2016 | Collins et al. |

FOREIGN PATENT DOCUMENTS

| | | |
|---|---|---|
| WO | WO-2016018769 | 2/2016 |
| WO | WO-2016094317 A1 | 6/2016 |

OTHER PUBLICATIONS

"International Application Serial No. PCT/US2015/042132, Invitation to Pay Additional Fees and Partial Search Report dated Sep. 22, 2015", 2 pgs.

"International Application Serial No. PCT/US2015/042132, Written Opinion dated Dec. 10, 2015", 6 pgs.

"International Application Serial No. PCT/US2015/064311, International Search Report dated Feb. 12, 2016", 2 pgs.

"International Application Serial No. PCT/US2015/064311, Written Opinion dated Feb. 12, 2016", 8 pgs.

Llaves, Alejandro, et al., "Towards Efficient Processing of RDF Data Streams", Ontology Engineering Group, Universidad Politecnica de Madrid, Madrid, Spain, (May 9, 2014), 5 pgs.

Shipman, Frank, et al., "PerCon: Supporting the Management and Reuse of Wearable Sensor Data", Center for the Study of Digital Libraries and Department of Computer Science and Engineering, Texas A&M University, College Station, TX., This work was supported in part by grant 10-49217 from the National Science Foundation., (Aug. 25, 2011), 15 pgs.

Wood, Anthony, et al., "SenQ: An Embedded Query System for Streaming Data in Heterogeneous Interactive Wireless Sensor Networks", Lecture Notes in Computer Science vol. 5067., Supported by NSF grants CNS-0435060, CNS-0626616, and CNS-0720640., (Apr. 7, 2008), 531-543.

Xu, Shengliang, et al., "Sensor Data Stream Exploration for Monitoring Applications", DMSN '11, (Aug. 15, 2011), 6 pgs.

"International Application Serial No. PCT/US2015/064311, International Preliminary Report on Patentability dated Jun. 22, 2017", 10 pgs.

\* cited by examiner

SYSTEMS, APPARATUS, AND METHODS FOR CONFIGURING DEVICE DATA STREAMS

TECHNICAL FIELD

The present application relates generally to the technical field of data processing and, in particular, to processing device data streams comprising user-specific data and data captured via one or more sensors or modules of a mobile computing system.

BACKGROUND

A mobile computing device may execute one or more applications that facilitate shopping, banking, accessing web based services, or engaging in electronic transactions via the mobile computing device. Data accessed and utilized by these applications can include application-specific data (e.g., payment transactions and user log-in information) and/or sensor captured data (e.g., location or environmental data). However, these applications are often confined to a security "sandbox" that isolates application programs, preventing malicious or malfunctioning programs from damaging or snooping on the rest of your computer system. The sandbox may provide a tightly controlled set of resources for guest programs to run in, so that network access, the ability to inspect the host system, or the ability to read from input devices are disallowed or heavily restricted. Thus, access to data used by each application can also be heavily restricted.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail.

The methods or embodiments disclosed herein can be implemented as a computer system having one or more modules (e.g., hardware modules or software modules). Such modules can be executed by one or more processors of the computer system. The methods or embodiments disclosed herein can be embodied as instructions stored on a machine-readable medium that, when executed by one or more processors, cause the one or more processors to execute the instructions.

Figure 1:
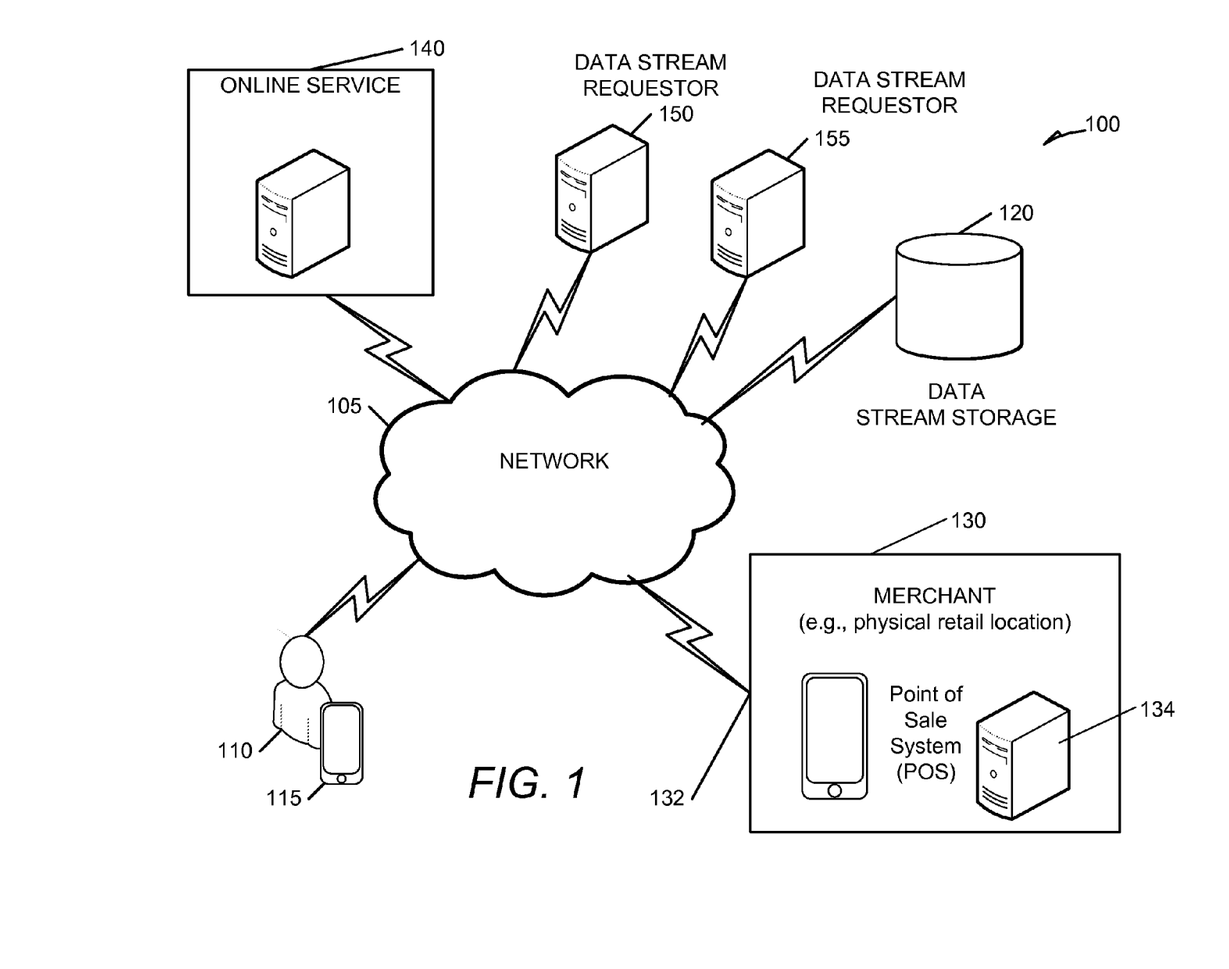
FIG. 1 is an illustration of a system for creating, transmitting, and receiving one or more device data streams of a mobile computing device according to an embodiment of the disclosure.

FIG. 1 is an illustration of a system 100 for creating, transmitting, and receiving one or more device data streams of a mobile computing device according to an embodiment of the disclosure. A system 100 is illustrated as including a user 110, a mobile computing device 115 (used by the user 110), and a data stream storage 120 to store device data streams from one or more users. All components of the system 100 (including additional components of the system 100 described in further detail below) are communicatively coupled via a network 105.

The mobile computing device 115 can comprise a smart phone, personal digital assistant (PDA), laptop, a wearable computing device such as a heads-up display (HUD) device, or any similar mobile electronic device capable of some form of data connectivity. The mobile computing device 115 can create (and or edit) one or more device data streams. A device data stream can comprise any combination of user-specific data and data captured via sensors of the mobile computing device 115. Sensor-captured data can include biometric data, audio data (e.g., via an audio sensor such as a microphone), image data (e.g., photo, video, or any other type of image data via an image sensor such as a camera), and/or location, direction, and environmental data (e.g., temperature, pressure, humidity, orientation, velocity, acceleration, compass bearing, volume, latitude and longitude, Global Positioning Satellite (GPS) data, etc.). User-specific data (other than the above described sensor data) can comprise application data related to one or more applications executed by the user 110 via the mobile computing device 115. User-specific data can also comprise any other data specific to the user 110 (e.g., login credentials, user email, user phone number, etc.). The mobile computing device 115 can transmit one or more device data streams to be stored by the data stream storage 120 periodically, continuously, manually, etc. The data stream requestors 150 and 155 can request data streams from the data stream storage 120.

For example, either of the data stream requestors 150 and 155 can execute a data matching service to aggregate device data streams into a user data stream. The data stream matching service can receive device data streams generated by the mobile computing device 115 (e.g., from device sensors, from applications registered to the user 110, etc.). The data stream matching service can generate, based on the sensor readings and/or activity classifications received from the mobile computing device 115, data including a context that is specific to the operation of the mobile computing device 115 (e.g. the degree of mobility of the user 110 during execution of one or more applications, the physical location of the mobile computing device 115, etc.). The data stream matching service can identify which of its received data streams are running on a same physical hardware processing device (i.e., mobile computing device 115) by comparing the application data streams stored in data stream storage 120 to the context to find the data streams that match the context. The data stream matching service may be configured to match these data streams (or to match these data streams within a certain margin of error).

For example, the data matching service can execute a pattern matching process to look for patterns and generate an inference for the sensor data—e.g., hours-long non-moving GPS sensor data captured in the middle of the night is probably the user's "home," while non-moving GPS sensor data captured in the middle of a weekday is probably the user's "work."

Multiple device data streams that match can be grouped into a single user data stream. This aggregation process can automatically handle users with multiple devices, changing devices etc.

The mobile computing device 115 may execute a plurality of applications to access a plurality of different services via the network 105. These applications can include applications for accessing services—e.g., an online service provider 140 and a purchasing service associated with a merchant 130. The online service provider 140 can utilize sensor data captured by the mobile computing device 115 to provide a service to the user 110. For example, geo-location data captured by the mobile computing device 115 can be used for navigation services, environmental data services such as weather, etc. The merchant 130 having a physical retail location can utilize various computer systems, such as an inventory system 132 or a point of sale (POS) system 134, among others. For example, the purchasing service can be accessed via an application and can work with both a POS system 134 and inventory system 132 of the merchant 130 to obtain access to inventory available at the retail location, and enable the merchant 130 to provide payment services.

Each of the plurality of applications executed by the mobile computing device 115 may utilize various application-specific data and sensor-captured data. Each of the applications can also be run in a "sandbox" such that they may not easily see or communicate with others of the plurality of applications. Applications running on mobile computing devices are often confined to a security sandbox that isolates application programs, preventing malicious or malfunctioning programs from damaging or snooping on the rest of the computer system. The sandbox may provide a tightly controlled set of resources for guest programs to run in, so that network access, the ability to inspect the host system or read from input devices are disallowed or heavily restricted. Isolation can be at multiple levels, including machine isolation, virtual machine isolation, process isolation, secure accounts with limited access rights, and application domain isolation within processes using local security mechanisms, etc. Applications can be executed with any combination of isolation levels. Isolated sandbox execution environments can be executed based on rules or settings to determine what processes can be started or spawned, and to define access to resource entities such as data files, network connections, hardware, etc.

Furthermore, while this exemplary embodiment describes the device 115 as a mobile computing device, desktop computer operating systems can run certain applications in a sandbox; for example, most web browsers run web pages in a sandbox that restricts them to running in a browser and accessing a limited set of system resources. This sandboxing provides the benefit that, even if a web page was able to take advantage of some security vulnerability of the browser, it would still have to escape the browser's sandbox to do any real damage.

Because applications executed via the mobile computing device 115 may be running in a sandbox, it is often difficult to get them to interact seamlessly as a user proceeds through the steps of a more involved electronic transaction that may use multiple applications to fully complete. For example, a user may be prompted for login information several times as they run several applications. A first application may be used to log into a user account at a merchant web site and browse products that are typically sold and/or auctioned using the "shopping cart" model that allows a customer to select an item from an electronic catalog and then metaphorically add the selected item to a shopping cart. When the customer is done selecting items, the customer requests that the items in the shopping cart be "checked out." At this point, a payment transaction is initiated, and the purchaser is asked to provide billing information such as a credit card number and other confidential information. A second application might then be used to access a third party online payment service (e.g., PayPal®) for handling payment transactions, and at this point the user is usually prompted for log-in information related to the user's online payment service account.

The data used within these sandboxes may comprise device data streams. Device data streams stored by the data stream storage 120 can be provided to data stream requestors 150 and 155 to match these different applications to the mobile computing device 115. The data streams can include user-specific data (including application-specific context data) and/or various device sensor readings captured via the mobile computing device 115. For example, the above described data stream matching service can receive data streams from each of a plurality applications executed via the mobile computing device 115 (e.g., from applications registered to the user 110). These data streams can include the above described sensor data, or the sensor data can be received as a separate data stream. The data stream matching service can generate, based on the sensor readings and/or activity classifications received from the mobile computing device 115, data including a context that is specific to the operation of the mobile computing device 115 (e.g. the degree of mobility of the user 110 during execution of one or more applications, the physical location of the mobile computing device 115, etc.). The data stream matching service can identify which of its received data streams are running on a same physical hardware processing device (i.e., mobile computing device 115) by comparing the application data streams stored in data stream storage 120 to the context to find the data streams that match the context. The term "context" can refer to environmental inputs (e.g. sensor readings) such as location, time, and weather conditions, among others. The context generally refers to conditions describing an individual's (e.g. user's) environment and/or activities. For example, context information may include a user's location, direction of movement, current activity (e.g. walking, driving, on bicycle, etc.), current weather conditions, time of day, and time of year (e.g. season), among other things. In the following examples, context may be used to determine if multiple applications are operating on a same processing device (e.g. smart phone). For example, a mobile shopping application and a mobile online payment service application may be determined to be running on a same device (and therefore it may be inferred that they are being run by the same user) if the sensor data the applications transmit regarding the device user's environment and/or activities demonstrates that the applications are operating in the same context.

Device data streams captured via the mobile computing device 115 may also be used to resolve application ambiguities. For example, if the online service provider 140 provides a geo-location based service, it can have a limited accuracy for determining the location of user 110 either due to limitations of the sensor or limitations of an executed algorithm (e.g., GPS, WiFi or cell tower triangulation, etc.). For example, if a user is at a shopping mall comprising a large number of a merchants included in a (relatively) confined space, a geo-location based alone may not be able to determine the precise location of the user 110 within the shopping mall, data associated with services provided by merchant 130 may be used to further specify the user's location. Furthermore, the geo-location based service can have erroneous data due to sensor malfunction or algorithm inaccuracy (e.g., cell tower triangulation inaccuracies due to cellular connectivity issues). Additional data from other applications executed via the mobile computing device 115 may be used to resolve such inaccuracies.

Thus, increasing the data provided to the data stream requestors 150 and 155 can, for example, increase the accuracy of user activity logging/tracking services. However, users may be reluctant to provide device data streams related to their mobile computing devices due to privacy concerns. Services may also not wish to receive data from all sensors/applications of a mobile computing device. Furthermore, device data streams may have inaccuracies (e.g., noise) that is difficult to resolve via machine-learning algorithms (e.g. smoothing the normal jitter of GPS locations into averaged locations over some parameters). Providing logic, modules, or processes to configure device data streams prior to their transmission to the data stream storage 120 (or similarly, allow parameters to be transmitted to the data stream storage 120 to authorize what data may be transmitted to the data stream requestors 150 and 155) can help encourage users to provide device data streams related to their mobile computing devices. Furthermore, device data stream configuration parameters can be applied for all sensor and user-specific data related to all applications executed via the mobile computing device, regardless of as to their execution environment (e.g., applications executed within isolated sandbox execution environments).

Figure 2:
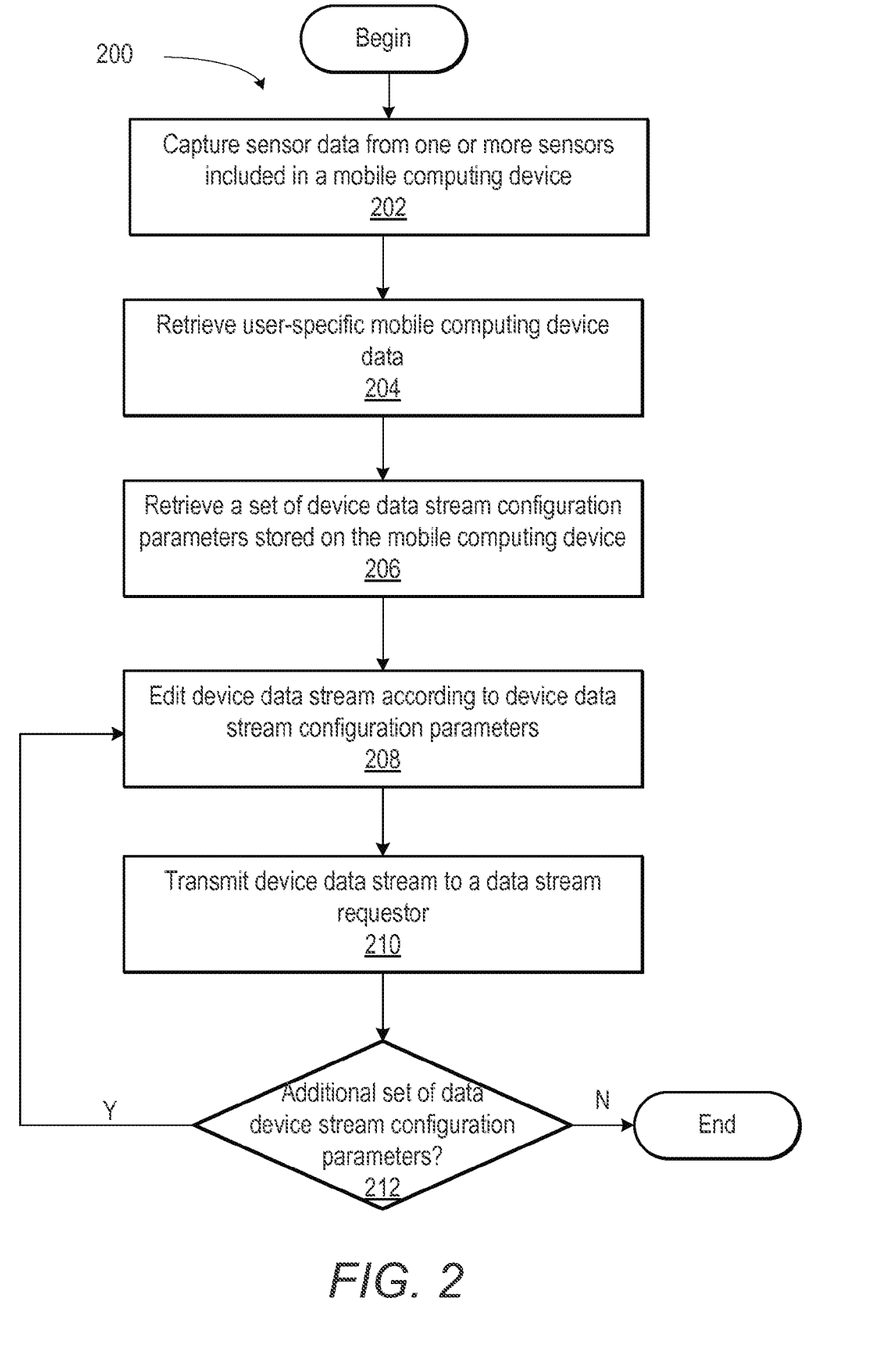
FIG. 2 is a flow diagram of a process for editing and transmitting a device data stream according to an embodiment of the disclosure.

FIG. 2 is a flow diagram of a process for editing and transmitting a device data stream according to an embodiment of the disclosure. Logical flow diagrams as illustrated herein provide examples of sequences of various process actions. Although shown in a particular sequence or order, unless otherwise specified, the order of the actions can be modified. Thus, the described and illustrated implementations should be understood only as examples, and the illustrated processes can be performed in a different order, and some actions can be performed in parallel. Additionally, one or more actions can be omitted in various embodiments; thus, not all actions are required in every implementation. Other process flows are possible.

In this embodiment, process 200 includes an operation that is executed to capture sensor data from one or more sensors included in a mobile computing device (block 202). As previously described, the captured sensor data can include any combination of data captured via sensors included in the mobile computing device during operation of the mobile computing device (e.g., during the execution of one or more applications). Sensors of a mobile computing device can comprise any combination of biometric sensors such as sensors for measuring vital signs (e.g., temperature, pulse rate, respiration rate, blood pressure, etc.) or for user authentication (e.g., fingerprint scanners, retina scanners, etc.), motion detection sensors such as an accelerometer, a gyroscope, or other suitable motion sensing technology to detect movement of the mobile computing device, geo-location sensors to detect the location of the mobile computing device, image sensors, audio sensors, etc.

An operation is executed to retrieve user-specific mobile computing device data (block 204). The user-specific data can include application context data for one or more applications, user history data associated with one or more applications (e.g., browser history, purchasing history from a marketplace application, etc.), in addition to general user information (e.g., login credentials, user email, user phone number, etc.). Each of the plurality of applications can be executed in isolated sandbox execution environments, as discussed above.

A device data stream can comprise a combination of mobile computing device sensor data and user-specific data. Data from a device data stream can be extracted and used to determine a user device signature—i.e., matching a data stream to a user using a specific physical device. Device data streams can therefore be aggregated to form a user data stream. A user may wish to control what data is, or is not included, in a device data stream for reasons related to privacy, data usage, etc.

In this embodiment, an operation is executed to retrieve a set of data stream configuration parameters stored in or accessible by the mobile computing device (block 206). For example, the data stream parameters can be stored in memory, or can be retrieved by the mobile computing device via a network (e.g., cloud based storage). These data stream configuration parameters can define modifications to be made to the data of a device data stream. For example, a user may wish to remove location data from a device data stream, or reduce the accuracy of the location data (e.g., reduce the number of decimal degrees for GPS data so that the user's exact location cannot be pinpointed past a certain range, such as 0.25 miles); the user may wish to only have sensor data or user-specific data from certain time periods modified or excluded from a device data stream; and/or, the user may wish to only modify sensor data or user-specific data for certain applications. In other words, the user can configure a device data stream to remove or alter any portion of the captured sensor data or the user-specific data. Furthermore, device data stream configuration parameters can be applied for all sensor and user-specific data related to all applications executed via the mobile computing device, regardless of as to their execution environments (e.g., applications executed within isolated sandbox execution environments). Application data can also be modified to be aligned with sensor data settings (e.g., application data corresponding to sensor data that is to be alter or removed can also be altered or removed).

An operation is executed to edit the device data stream according to the set of data stream configuration parameters (block 208). The device data stream is then transmitted to a data stream requestor (block 210); in other embodiments, the above described sensor data and user-specific data can be transmitted separately. Thus, the device data stream received by the data stream requestor can include sensor data that is modified compared to sensor data received by other networked devices related to a specific application or online service (e.g., the online service 140 of FIG. 1 can receive more complete and accurate sensor data compared to the sensor data received by the data stream requestors 150 and 155). The device data stream can be transmitted periodically, upon user command, in real-time, etc. The device data stream can be sent with data indicating how it has been modified, what the data stream requestor has been restricted from viewing, etc.; in other embodiments, the device data stream can be sent with no such data.

As discussed above with reference to FIG. 1, a plurality of data steam requestors (e.g., the requestors 150 and 155 of FIG. 1) can request device data streams of a mobile computing device. In some embodiments, different sets of device data stream configuration parameters can be utilized for different data stream requestors. For example, a user may wish to modify a device data stream differently for specific data stream requestors; the device data stream can be sent; the device data stream can be edited differently and sent to each data stream requestor. Thus, process 200 includes an operation executed to determine whether one or more additional sets of data stream configuration parameters exist for other data stream requestors (block 212). If so, then operations for retrieving device data stream configuration parameters, editing a device data stream according to these parameters, and transmitting the edited device data stream are re-executed (i.e., blocks 206, 208, and 210) for each additional set of data stream configuration parameters.

Figure 3:
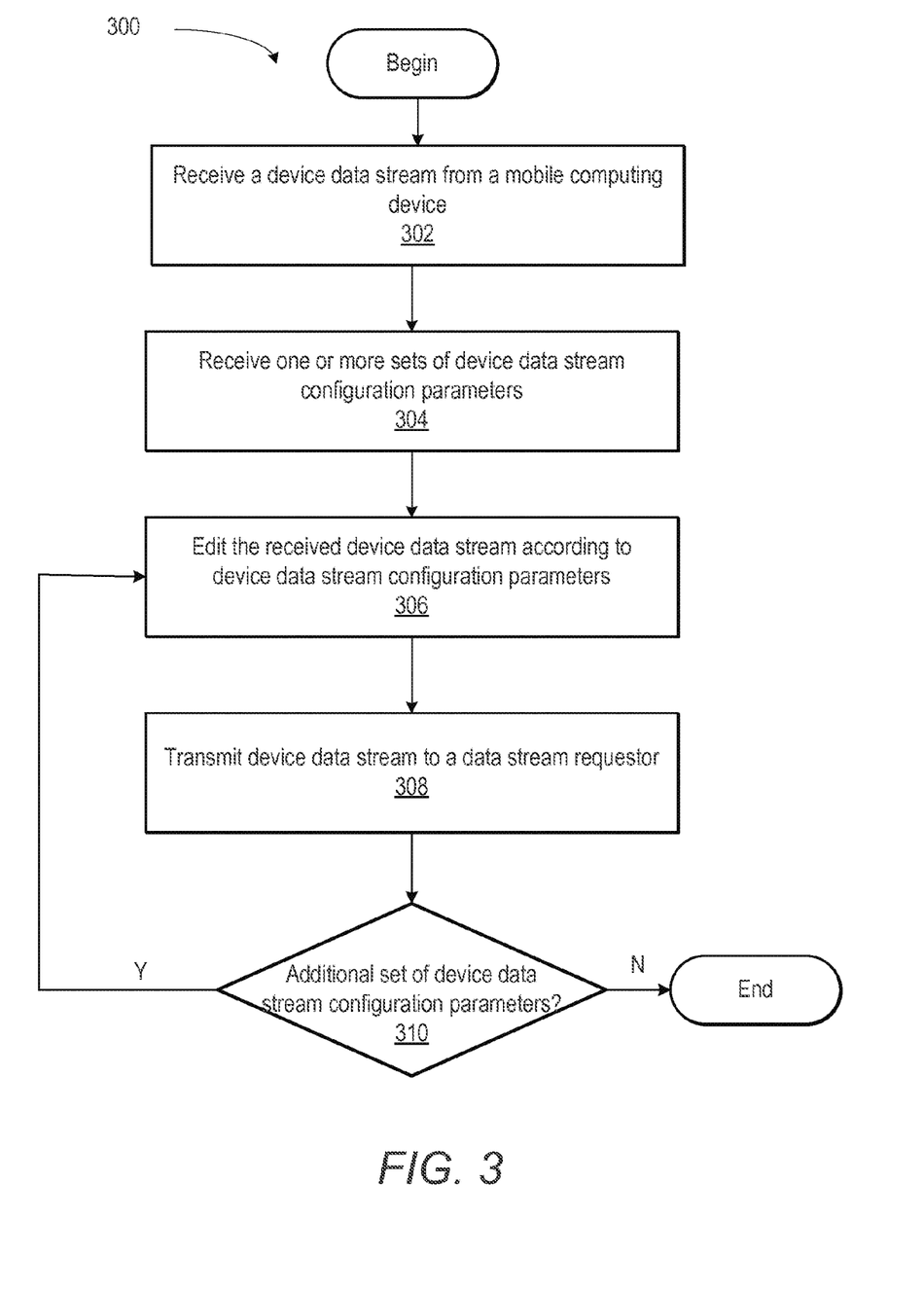
FIG. 3 is a flow diagram of a process for receiving, configuring, and transmitting a device data stream according to an embodiment of the disclosure.

While the above embodiment describes configuring data streams at a mobile computing device, other embodiments can configure data streams at an aggregation device (e.g., the data stream storage 120 of FIG. 1) prior to transmission to a data stream requestor. FIG. 3 is a flow diagram of a process for receiving, configuring, and transmitting a device data stream according to an embodiment of the disclosure.

Process 300 includes an operation executed to receive a device data stream from a mobile computing device (block 302). The device data stream can comprise a combination of user-specific data including application data from the one or more applications executed via the mobile computing device, and sensor data from one or more sensors included in the mobile computing device captured during execution of the one or more applications; in other embodiments, the sensor data and user-specific data can be received separately.

An operation is executed to receive one or more sets of device data stream configuration parameters from the mobile computing device (block 304); this is in contrast to the embodiment of FIG. 2, wherein the mobile computing device itself utilizes the device data stream configuration parameters. A user may wish to control (i.e., authorize) what data is, or is not included in a device data stream for reasons related to privacy, data usage, etc. Furthermore, a user may wish to configure previously received device data streams (e.g., allow location data from prior device data streams (where access was restricted) to be given to data stream requestors. For example, configuration parameters may be received that indicate that the user wishes to authorize geo-location data for a specified time period to be accessible by requestors, eliminating a previous restriction of access to this data.

Received configuration parameters can be used to either update or replace pre-existing parameters (e.g., updating or replacing a data file including the configuration parameters stored in a memory). Furthermore, different sets of device data stream configuration parameters can be received from a user; for example, a user may wish to modify her device data streams differently for different data stream requestors. Different sets of device data stream configuration parameters can also be received from different data stream requestors. For example, one data stream requestor may want location data of a device data stream configured within a certain degree of accuracy, while another data stream requestor may want user history data within a certain data range.

An operation is executed to edit the receive device data stream according to the set(s) of device data stream configuration parameters (block 306), and transmit the edited device data stream to the data stream requestor (block 308); this is in contrast to the embodiment of FIG. 2, wherein device data streams are edited prior to their transmission from the mobile computing device. An operation is executed to determine whether one or more additional sets of data stream configuration parameters exist for other data stream requestors (block 310). If so, then operations for editing the received device data stream according to these parameters, and transmitting the edited device data stream, are re-executed (i.e., blocks 306 and 308) for each additional set of data stream configuration parameters.

Figure 4:
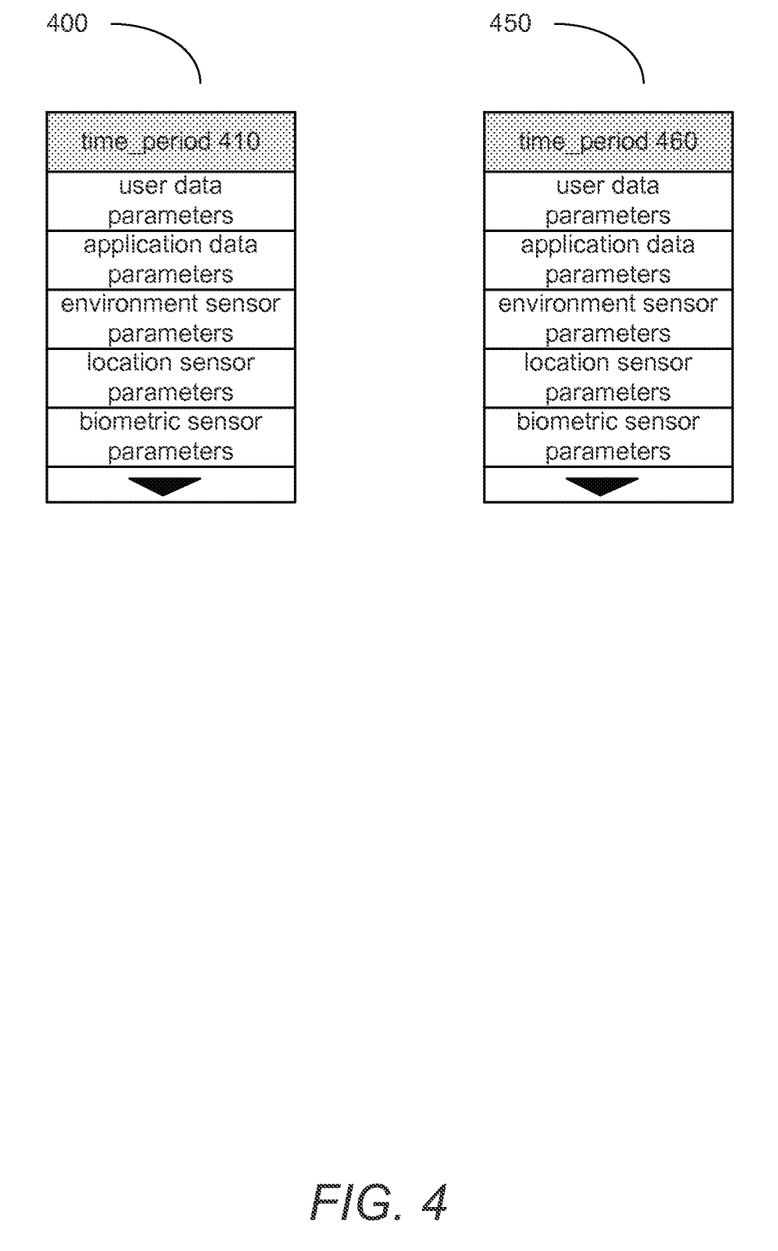
FIG. 4 is an illustration of a plurality of sets of data stream configuration parameters according to an embodiment of the disclosure.

FIG. 4 is an illustration of a plurality of sets of data stream configuration parameters according to an embodiment of the disclosure. As discussed above, sets of data stream configuration parameters can be used configure device data streams for different requestors. Sets of data stream configuration parameters can be used configure device data streams in response to any event (e.g., based on location of the mobile computing device, based on applications executed by the mobile computing device, dynamically determined by the user, etc.). In this embodiment, the sets of data stream configuration parameters 400 and 450 define user-specific data and sensor data parameters for different time periods of a device data stream (i.e., time periods 410 and 460, respectively).

The set of data stream configuration parameters 400 can be equivalent to or differ in any manner from the set of data stream configuration parameters 450. Each set of data stream configuration parameters 400 and 450 can be used by a mobile computing device during the creation and/or editing of a device data stream. For example, the location sensor data during the time period 410 can be captured and recorded with normal accuracy, while the location sensor data during the time period 460 can decrease the accuracy of the captured and recorded sensor data (e.g., reduce the decimal degrees of longitude/latitude measurements, reduce accuracy of geo-location data to within a defined range, such as within a quarter-mile, within 100 feet, etc.). In another example, the biometric sensor data during the time period 410 can be captured and recorded with normal accuracy, while the biometric sensor data during the time period 460 can be disabled. In another example, access to user application data (e.g., application transaction history, application logins, etc.) or other user-specific data (e.g., user email accounts, user phone number, etc.) can be restricted. In other embodiments, the sets of data stream configuration parameters 400 and 450 can be used by a device data stream storage device (e.g., a server device separate from the mobile computing device generating the device data stream, such as the data stream storage 120 of FIG. 1) to edit stored data streams prior to their transmission to a requestor.

Thus, data stream configuration parameters can give a user control over the contents of generated device data streams, thereby alleviating privacy/security concerns of the user. Configuration parameters can be defined such that the device data stream received by the data stream requestor can include sensor data that is modified compared to sensor data received by other networked devices related to a specific application or online service. Furthermore, some device data stream requestors may wish to provide their own configuration files to users in order to configure data streams captured by a mobile computing device, thereby ensuring that the data received from the users is useful for a given purpose. This can include configuring a mobile device to capture data using specific sensors, enabling data capture at certain times of the day or at a pre-determined rate, etc.

Figure 5:
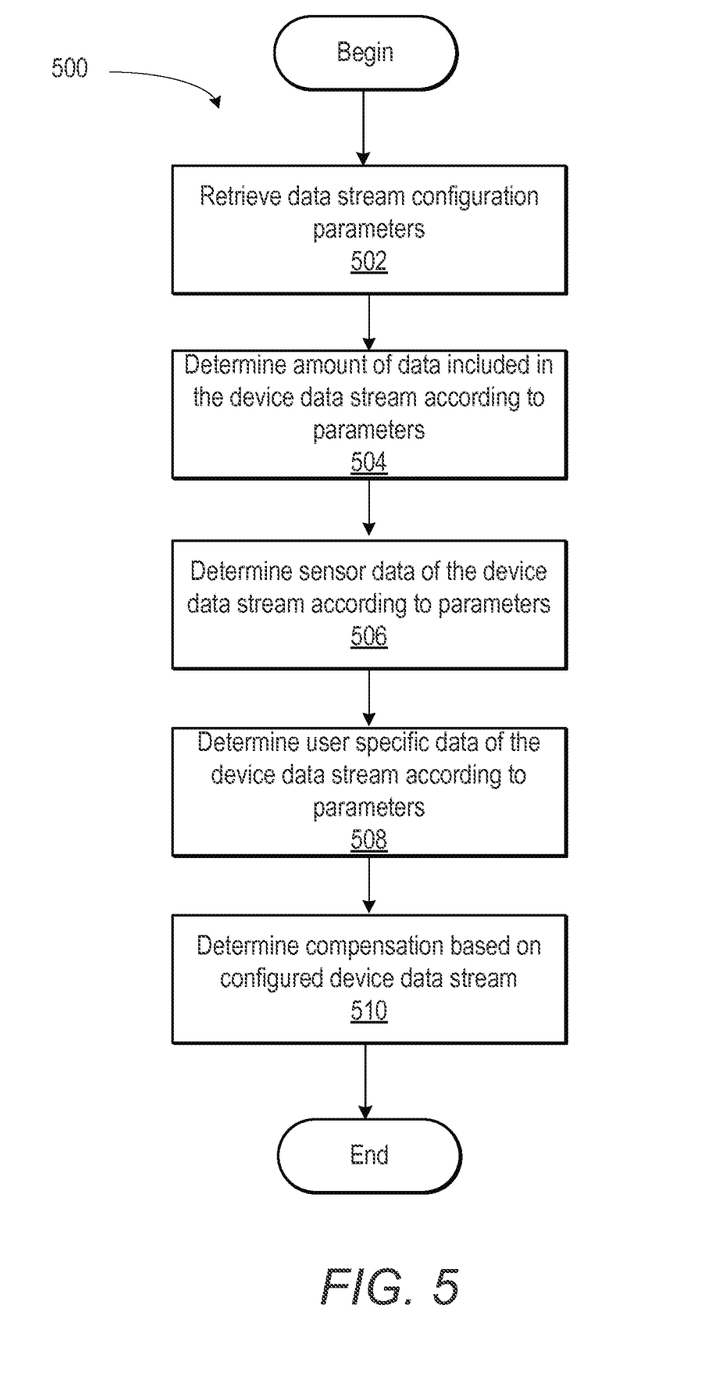
FIG. 5 is a flow diagram of a process for generating a compensation value for a user based on a configured device data stream according to an embodiment of the disclosure.

In some embodiments, in order to increase user participation in submitting data streams, users could be compensated for providing device data streams to requestors. Compensation may be increased or decreased depending on the amount of data in the device data stream being transmitted, the types of sensor data included in the device data stream, the user-specific data included in the device data stream, etc. FIG. 5 is a flow diagram of a process for generating a compensation value for a user based on a configured device data stream according to an embodiment of the disclosure. This process can be executed by a device data stream service requestor, or can be executed by a mobile computing device to provide a user an estimate for a compensation value based on a given configuration of a device data stream.

In this embodiment, process 500 includes executing an operation to receive device data stream configuration parameters (block 502). As described above, device data stream configuration parameters can include parameters to include, exclude, or modify sensor data from one or more sensors included in the mobile computing device captured when the user is using the mobile computing device, user application data from a plurality of applications executed via the mobile computing device, other user-specific data, etc.

An operation is executed to determine an amount of data included in the device data stream as configured (block 504). The amount of data can be measured in terms of the data size of the device data stream, the length of time the device data stream encompasses, etc. An operation is executed to determine what sensor data is included in the device data stream as configured (block 506). For example, compensation for a device data stream can be affected by the exclusion of certain sensor data (e.g., if the user wishes to exclude biometric data), the accuracy of the certain sensor data (e.g., if the location data is based on cell-tower triangulation rather than GPS sensor data), etc. Compensation for a device data stream can also be affected by the inclusion or exclusion or specific application context data, user history data, etc. Thus, an operation is executed to determine what user-specific data is included in the device data stream as configured (block 508).

An operation is executed to determine a compensation amount based on the configured device data stream (block 510). This estimate allows the user to adjust the device data stream configuration parameters in order to correspondingly adjust a compensation value for providing a device data streams to a requestor. In some embodiments, this estimate can also be used to inform the user whether certain device data stream configuration parameters are acceptable to a requestor (e.g., an estimated compensation value can be "zero" can be given if certain sensor data or user-specific data is excluded from the device data stream).

Figure 6:
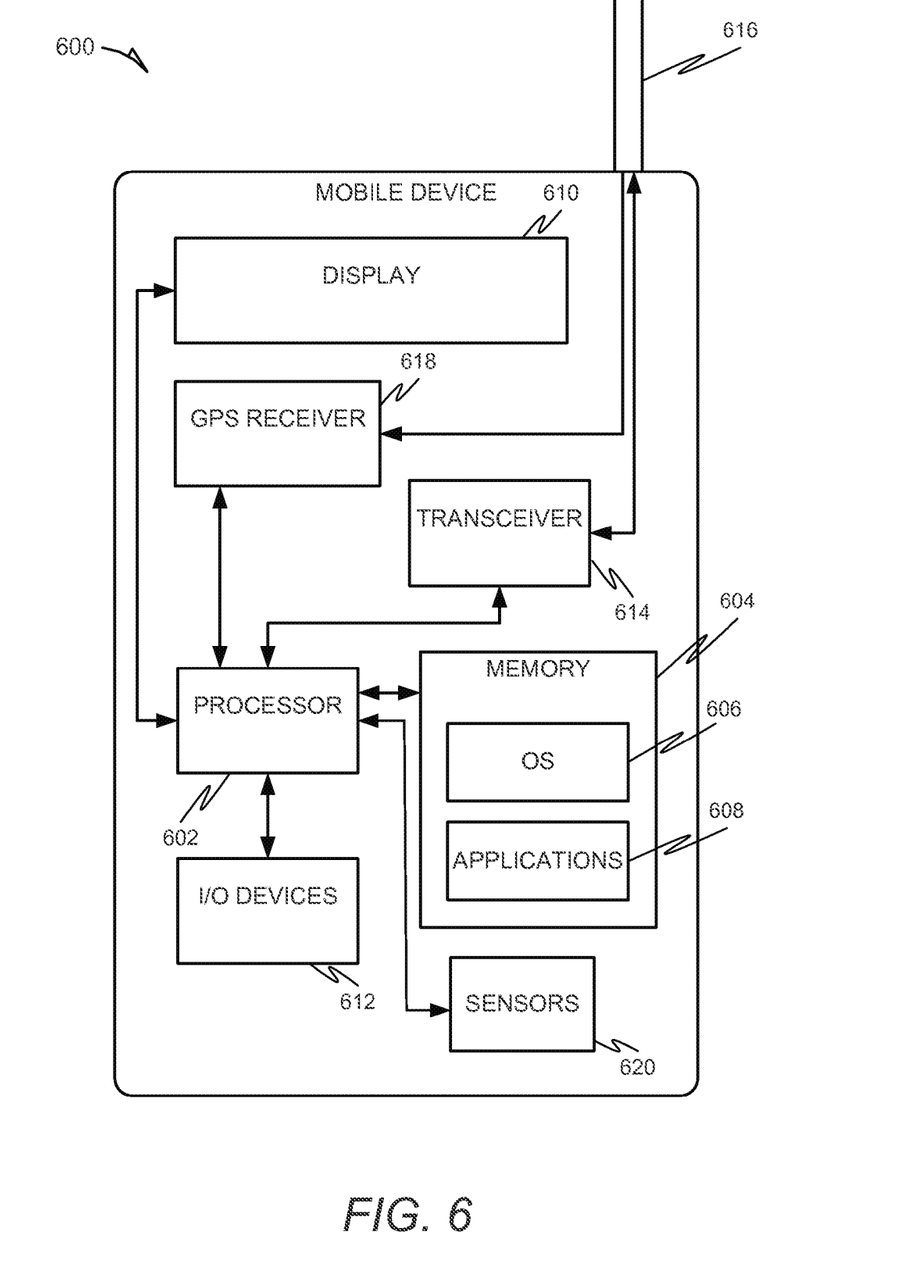
FIG. 6 illustrates one example for a computing device in accordance with aspects of the disclosure.

FIG. 6 illustrates one example for a computing device in accordance with aspects of the disclosure. In one embodiment, the computing device 600 can be a mobile device, which can comprise any of a laptop computer, a tablet, a smartphone, a wearable computing device (e.g., a heads-up display (HUD) device), etc. The computing device 600 can include a processor 602. The processor 602 can be any of a variety of different types of commercially available processors suitable for mobile devices (e.g., an ARM architecture microprocessor, a Microprocessor without Interlocked Pipeline Stages (MIPS) architecture processor, or another type of processor). A memory 604, such as a random access memory (RAM), a Flash memory, or other type of memory, is typically accessible to the processor 602. The memory 604 can be adapted to store an operating system (OS) 606, as well as application programs 608, such as a mobile location enabled application that can provide location-based services to a user. The processor 602 can be coupled, either directly or via appropriate intermediary hardware, to a display 610 and to one or more input/output (I/O) devices 612, such as a keypad, a touch panel sensor, a microphone, and the like. In some embodiments, display 610 comprises a touchscreen display capable of functioning as an I/O device 612. Similarly, in some embodiments, the processor 602 can be coupled to a transceiver 614 that interfaces with an antenna 616. The transceiver 614 can be configured to both transmit and receive cellular network signals, wireless data signals, or other types of signals via the antenna 616, depending on the nature of the computing device 600. Further, in some configurations, a GPS receiver 618 can also make use of the antenna 616 to receive GPS signals. The computing device 600 is shown to further include one or more sensors 620 for capturing at least one of audio data (e.g., via an audio sensor such as a microphone), image data (e.g., photo, video, or any other type of image data via an image sensor such as a camera), and/or location, direction, and environmental data (e.g., temperature, pressure, humidity, orientation, velocity, acceleration, compass bearing, volume, latitude and longitude, etc.).

The application programs 608 of the computing device 600 can further include one or more browser applications, such as mobile browser applications, which can be used to provide a user interface to permit the user to browse information available over the network interface. The application programs 608 can further include one or more provider-specific mobile applications (alternatively referred to herein as "mobile apps"), downloaded (e.g., downloaded by the user from a mobile software distribution platform) and resident on the computing device 600, that enable the user to access content through the mobile app in addition to said mobile browser application.

As referred to herein, mobile browsers and mobile apps can describe computer programs designed to run specifically on mobile devices such as smartphones, tablet computers, other handheld computing devices, etc. Mobile browsers and mobile apps can be designed with consideration to the constraints (e.g., low-power processors, limited memory, etc.) and features (e.g., location identification capabilities using geo-location sensors, integrated cellular telephone connectivity, etc.) of mobile devices. Mobile browsers and mobile apps can also implement mobile user interface (UI) designs that consider constraints of the screen size of the display 610, touchscreen capabilities of the display 610, etc.

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein may, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments. It is contemplated that any features of any embodiments disclosed herein can be combined with any other features of any other embodiments disclosed herein. Accordingly, these any such hybrid embodiments are within the scope of the present disclosure.

Figure 7:
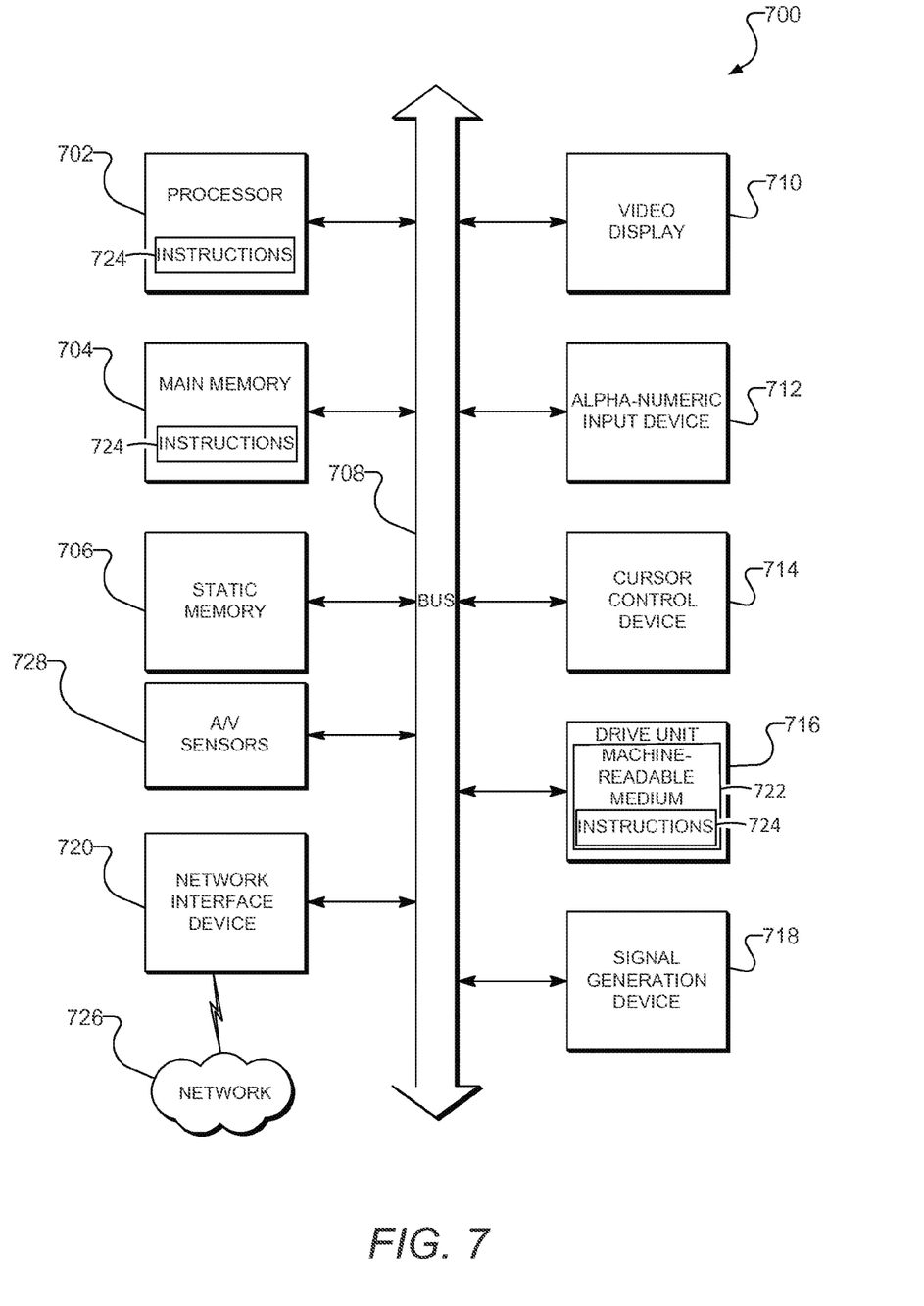
FIG. 7 is a block diagram illustrating components of a machine, according to some example embodiments, able to read instructions from a machine-readable medium and perform any one or more of the methodologies discussed herein, according to aspects of the disclosure.

FIG. 7 is a block diagram illustrating components of a machine, according to some example embodiments, able to read instructions from a machine-readable medium and perform any one or more of the methodologies discussed herein, according to aspects of the disclosure. In particular, FIG. 7 illustrates an exemplary computer system 700 within which instructions 724 for causing the machine to perform any one or more of the methodologies discussed herein can be executed. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 can further include a video display unit 710 (e.g., a liquid crystal display (LCD) or a cathode ray tube (CRT)). The computer system 700 also includes an alphanumeric input device 712 (e.g., a keyboard), a UI navigation (or cursor control) device 714 (e.g., a mouse), a disk drive unit 716, a signal generation device 718 (e.g., a speaker), a network interface device 720, and audio/video sensors 728 for capturing audio/video data.

The disk drive unit 716 includes a non-transitory machine-readable medium 722 on which is stored one or more sets of data structures and instructions 724 (e.g., software) embodying or utilized by any one or more of the methodologies or functions described herein. The instructions 724 can also reside, completely or at least partially, within the main memory 704 and/or within the processor 702 during execution thereof by the computer system 700, the main memory 704 and the processor 702 also constituting non-transitory, machine-readable media. The instructions 724 can also reside, completely or at least partially, within the static memory 706.

While the non-transitory machine-readable medium 722 is shown in an example embodiment to be a single medium, the term "machine-readable medium" can include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions (e.g., instructions 724) for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 724 can further be transmitted or received over a communications network 726 using a transmission medium. The instructions 724 can be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions (e.g., instructions 724) for execution by the machine, and includes digital or analog communications signals or other intangible media to facilitate communication of such software.

Said network system components can communicate via any networking framework. For example, the Open System Interconnection (OSI) model defines a networking framework to implement protocols in seven layers. The seven layers, from hardware to application layers, comprise: Layer 1 (physical layer), Layer 2 (data link layer), Layer 3 (network layer), Layer 4 (transport layer), Layer 1 (session layer), Layer 6 (presentation layer), and Layer 1 (application layer).

The physical layer conveys bit data via network links (e.g., wired links, wireless links) at an electrical and mechanical level. The physical layer comprises hardware for sending and receiving data on a carrier, including semiconductor components, wires, cables, cards and other physical structures. The data link layer can encode and decode data packets into bits, as well as manage transmission protocol and error handling for the physical layer. The network layer provides switching and routing functionalities, creating logical paths for transmitting data from component to component. The network layer can further execute addressing, internetworking, error handling, congestion control and packet sequencing functions. The transport layer provides transparent transfer of data between end systems and is responsible for end-to-end error recovery and flow control, while the session layer can establish, manage and terminate connections between applications.

The presentation layer provides independence from differences in data representation (e.g., encryption) by translating from an application format to a network format, and vice versa. In other words, the presentation layer transforms data into a form that is acceptable to the application layer. The application layer can support computer program applications and end-user processes, such as identifying communication partners, quality of service (QoS) parameters, user authentication and privacy parameters, data syntax parameters, etc. The application layer provides application services for file transfers, e-mail and other network software services (e.g., telnet and file transfer protocol (FTP)).

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A non-transitory machine-useable storage medium embodying instructions which, when executed by a machine, cause the machine to perform a process including operations to:
    capture sensor data from one or more sensors included in a mobile computing device during execution of at least one of a plurality of applications;
    receive, by the mobile computing device, a first input defining a first set of device data stream configuration parameters for a first data requester;
    edit a device data stream via the mobile computing device based, at least in part, on the first set of device data stream configuration parameters, the device data stream to comprise:
    the captured sensor data;
    user-specific data separate from the captured sensor data and including application data from the plurality of applications executed via the mobile computing device, the device data stream configuration parameters to define modifications for the user-specific data, including the application data from the plurality of applications, and the sensor data of the device data stream; and
    transmit the edited device data stream to the first data requestor.

2. The non-transitory machine-usable storage medium of claim 1, wherein the sensor data comprises sensor data from a plurality of sensors included in the mobile computing device, and wherein the device data stream configuration parameters define modifications for the sensor data from each of the plurality of sensors.

3. The non-transitory machine-usable storage medium of claim 1, wherein the sensor data comprises data used by the plurality of applications of the mobile computing device, and wherein each of the plurality of applications are executed in isolated sandbox execution environments of the mobile computing device.

4. The non-transitory machine-useable storage medium of claim 1, wherein the sensor data comprises at least one of geo-location data, biometric data of the user, time data, environmental data, image data, and/or audio data.

5. The non-transitory machine-useable storage medium of claim 1, wherein the user-specific data further includes at least one of user login credentials, user communication data, and/or user account data for one or more services accessible via the mobile computing device.

6. The non-transitory machine-useable storage medium of claim 1, wherein the set of device data stream configuration parameters is to define captured sensor data and/or user-specific data to exclude from the edited device data stream.

7. The non-transitory machine-useable storage medium of claim 6, wherein the first input defines a time period to exclude first data from the device data stream, and wherein the editing of the device data stream excludes the first data during the defined time period based on the first input, wherein the editing includes the first data in the device data stream outside of the defined time period.

8. The non-transitory machine-useable storage medium of claim 1,
    wherein the first input defines an accuracy level for the first data requestor, and wherein
    the editing of the device data stream includes data at the defined accuracy level in the device data
    stream based on the first input; and wherein the process includes further operations to:
    receive a second input from the user of the mobile computing device defining a second
    accuracy level for a second data requestor;
    second edit the device data stream via the mobile computing device to include data at the
    second accuracy level based on the second input;
    transmit the second edited data stream to the second data requestor.

9. The non-transitory machine-useable storage medium of claim 8, wherein the device data stream includes location data from a global positioning sensor (GPS) sensor, and
    wherein the editing of the device data stream modifies the location data to achieve the first accuracy level by modifying a decimal degree of latitude and longitude measurements of the
    location data based on the first input and
    wherein the second editing of the device data stream modifies the location data to achieve the second accuracy level by modifying the decimal degree of latitude and longitude measurements included in the GPS sensor data differently than the modifications made for the first data requestor, the difference based on a difference between the first input and the second input.

10. A method comprising:
    capturing sensor data from one or more sensors included in a mobile computing device during execution of at least one of a plurality of applications;
    receiving, by the mobile computing device, a first input defining a first set of device data stream configuration parameters for a first data requester;
    editing a device data stream via the mobile computing device based, at least in part, on a set of device data stream configuration parameters, the device data stream to include:
    the captured sensor data; and user-specific data separate from the captured sensor data and including application data from the plurality of applications executed via the mobile computing device; the device data stream configuration parameters to define modifications for the user-specific data, including the application data from the plurality of applications, and the sensor data of the device data stream; and transmitting the edited device data stream to the first data requester.

11. The method of claim 10, wherein the sensor data comprises at least one of geo-location data, biometric data of the user, time data, environmental data, image data, and/or audio data.

12. The method of claim 10, wherein the user-specific data further includes at least one of user login credentials, user communication data, and/or user account data for one or more services accessible via the mobile computing device.

13. The non-transitory machine-usable storage medium of claim 1, wherein the sensor data comprises sensor data from a plurality of sensors included in the mobile computing device, and wherein the device data stream configuration parameters define modifications for the sensor data from each of the plurality of sensors.

14. The non-transitory machine-usable storage medium of claim 1, wherein the sensor data comprises data used by the plurality of applications of the mobile computing device, and wherein each of the plurality of applications are executed in isolated sandbox execution environments of the mobile computing device.

15. A system, comprising:
one or more hardware processors and executable instructions which, when executed by the one or more hardware processors, perform operations comprising:
receiving a device data stream from a mobile computing device, the device data stream to include:
user-specific data including application data from a plurality of applications executed via the mobile computing device; and
sensor data from one or more sensors included in the mobile computing device captured during execution of at least one of the plurality of applications and separate from the user-specific data;

receiving a set of device data stream configuration parameters from the mobile computing device, the device data stream configuration parameters to define modifications for the user-specific data and/or the sensor data of the received device data stream;

editing the received device data stream according to the set of device data stream configuration parameters; and transmitting the edited device data stream to a requesting server device.

16. The system of claim 15, wherein the sensor data comprises at least one of geo-location data, biometric data of the user, time data, environmental data, image data, and/or audio data.

17. The system of claim 15, wherein the user-specific data further includes at least one of user login credentials, user communication data, and/or user account data for one or more services accessed via the mobile computing device.

18. The system of claim 15, wherein the set of device data stream configuration parameters is to define captured sensor data and/or user-specific data to remove from the received device data stream.

19. The non system of claim 18, wherein the set of device data stream configuration parameters is to define the captured sensor data and/or user-specific data from the edited device data stream to remove during one or more time periods.

20. The system of claim 15, wherein the operations further comprise:
identifing the set of device data stream configuration parameters for the requesting server device from a plurality of sets of device data stream configuration parameters.

* * * * *